March 22, 1955  P. J. KIRCHER  2,704,506
SELF-EMPTYING COFFEE MAKER
Filed March 16, 1954  2 Sheets-Sheet 1

INVENTOR.
PAUL J. KIRCHER
BY
Lindsey and Pritzman
ATTORNEYS

March 22, 1955    P. J. KIRCHER    2,704,506
SELF-EMPTYING COFFEE MAKER
Filed March 16, 1954.    2 Sheets-Sheet 2
FIG. 2
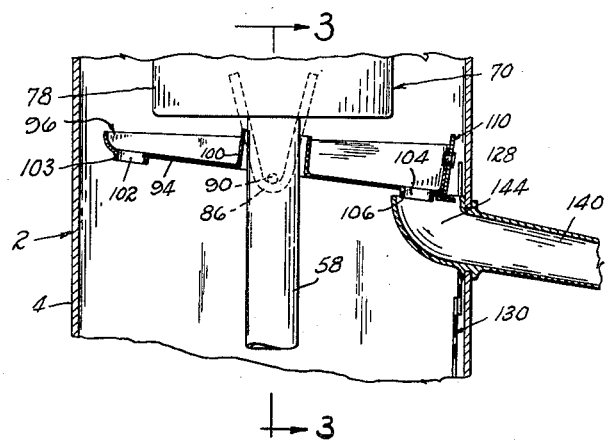
FIG. 3
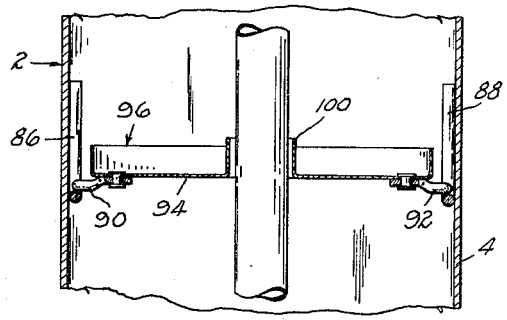
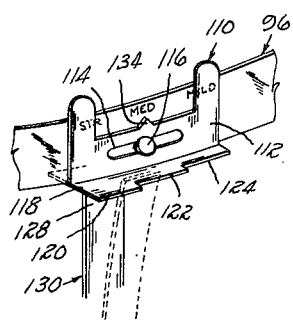
FIG. 4
INVENTOR.
PAUL J. KIRCHER
BY
Lindsey and Prutzman
ATTORNEYS

United States Patent Office 2,704,506
Patented Mar. 22, 1955

2,704,506

SELF-EMPTYING COFFEE MAKER

Paul J. Kircher, Plainville, Conn., assignor to Landers, Frary & Clark, New Britain, Conn., a corporation of Connecticut Application March 16, 1954, Serial No. 416,602

6 Claims. (Cl. 99—283)

The present invention relates to coffee makers, and more particularly to an improved coffee maker of the percolator type for automatically brewing a desired amount of coffee to the desired strength and automatically serving the same at the completion of the brewing process.

A principal object of the invention is to provide an improved coffee maker which automatically brews a preselected amount of coffee to a desired strength, and which automatically empties itself when the brewing process is completed and discharges the brewed coffee into another receptacle, such as a coffee cup, without attention of any kind.

Another object is to provide a coffee maker of the character described which is simple and economical in design, which can be fabricated and assembled with a minimum of cost and effort, and which will be foolproof in operation over long periods of time without repair or replacement.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 2 is another view of a portion of Figure 1 showing the position of the parts thereof during the self-emptying phase of the coffee maker operation;

Figure 3 is a sectional view of the structure shown in Figure 2 taken on the line 3—3 thereof; and Figure 4 is a detailed perspective view of a portion of the structure shown in Figure 1.

Figure 1:
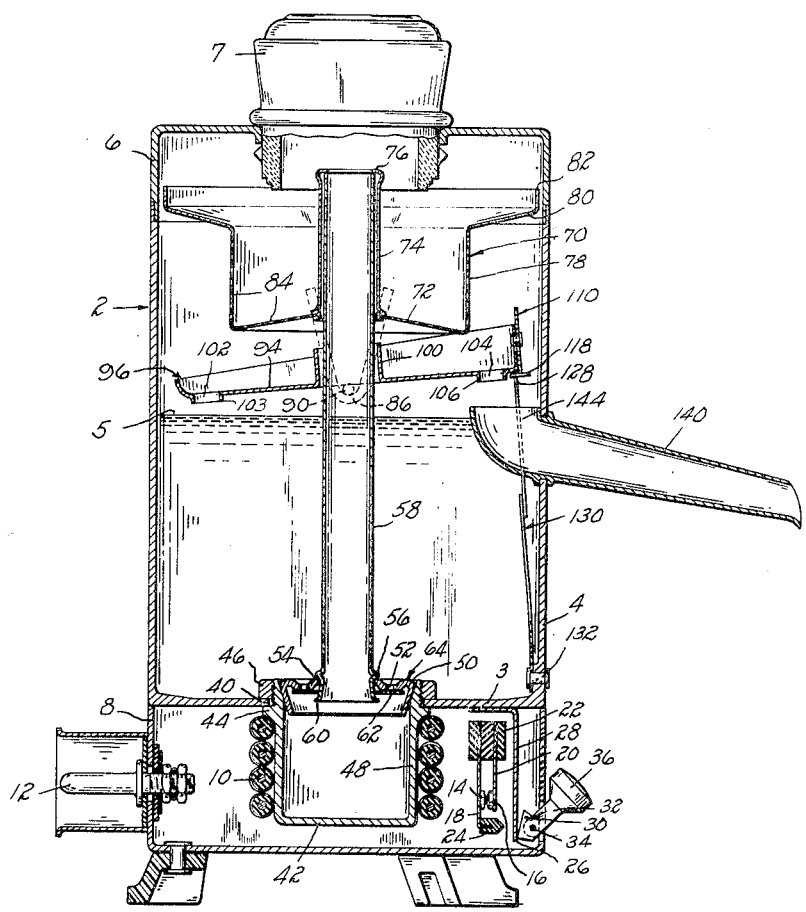
Figure 1 is a vertical sectional view of a coffee maker constructed in accordance with the present invention.

Referring to the drawings, and particularly Figure 1 thereof, a coffee maker constructed in accordance with the present invention includes a vessel or container 2 for holding water to be heated. The vessel 2 is adapted to be filled with any desired amount of water, corresponding to the maximum water level as shown by the line 5. The top of the vessel is closed by a cover 6 which is centrally apertured to receive the usual glass top 7.

The water in the vessel may be heated in any desired way but the coffee maker shown in the drawing is of the electrically heated type, and accordingly the vessel 2 is provided with a false bottom 8 within which is enclosed a heating unit consisting of a heating coil 10 which is wired to the usual two-pronged electrical connector 12.

To enable manual control of the energization of the heating coil 10, a manual switching arrangement is provided which includes a pair of switch contacts 14, 16 mounted on respective flexible contact arms 18, 20. The contact arms 18, 20 are supported from an insulating member 22 and are self-biased to maintain the contacts 14, 16 in a closed position. The switch contacts are connected electrically in series with the heater coil by the usual wiring (not shown). At the outer end of one of the contact arms 18 is a laterally extending insulated lug 24. Spaced opposite the lug 24 is the lower extremity 26 of a bimetallic strip element 28 which is secured to and depends downwardly from the bottom of the vessel 2. Adapted to engage the end 26 of the bimetallic strip 28 on its side opposite the lug 24 is a cam 30, integral with the end of a switch arm 32 pivotally mounted at 34 on the side of the false bottom 8 and extending outwardly therefrom. At the outer end of arm 32 is a knob 36 for manually pivoting the same. The arrangement is such that when the knob 36 is in its uppermost position, and strip 28 is relatively cool, lug 24 is not engaged by strip 28, and contacts 14, 16 are closed, permitting coil 10 to be energized. This is the "On" position of the switch. When knob 36 is moved down, cam 30 pushes strip 28 against lug 24 and opens the contacts 14, 16. This is the "Off" position. When strip 28 is heated above a desired temperature level, it curves inwardly and engages lug 24 to open contacts 14, 16 automatically. When so curved, the lower end of strip 28 disengages from cam 30 far enough to allow arm 32 to fall by gravity to the lower position of knob 36. This re-engages cam 30 with strip 28 and holds the contacts 14, 16 open even when strip 28 cools, thus automatically shutting off the coffee maker and requiring the switch to be manually reset to re-energize the coil 10.

The central portion of the bottom 3 of vessel 2 is provided with an aperture 40 through which protrudes the top of a downwardly extending generally cylindrical well 42. Well 42 has a circumferential shoulder 44 which engages the lower side of the vessel bottom and permits the well to be sealed thereto by a clamping ring 46 threaded to the top of the well. The sides 48 of well 42 are disposed in intimate contact with the heating coil 10, and the top of the well is closed by a cover plate 50 having a circle of perforations 52 therein for admitting water from the vessel proper into the well. The cover plate 50 has an aperture 54 at its center, and supported therein by a circumferential ridge 56 is an upstanding hollow stem or fountain tube 58. The lower end of fountain tube 58 extends below cover plate 50 and has an outturned flange 60 on which is loosely supported a ring 62 which is freely axially slidable on the lower end of the fountain tube. Upward movement of the ring 62 is limited by its engagement with the cover plate coincident with the perforations therein, and the ring 62 and cover plate 50 thus provide a valving mechanism 64 by which water is admitted from the vessel into the well for heating, and, upon being heated and partially converted into steam, pumps itself up through the fountain tube to the top of the vessel, in the usual manner.

At the top of the fountain tube 58 is a generally cylindrical basket 70 which is adapted to be filled with ground coffee. The bottom 72 of the basket is inwardly somewhat concave and is provided with an enlarged central aperture at which is secured the lower end of a hollow upstanding stem 74. The stem 74 fits over the top of fountain tube 58 and has an inturned flange 76 at its top end which rests on the upper end of the fountain tube and supports the basket 70. Basket 70 is preferably substantially smaller in diameter than the diameter of the vessel, so that the side 78 of the basket is well spaced from the wall of the vessel 2. At its top the basket has an enlarged outwardly and slightly upwardly inclined flange 80, terminating at its outer edge in a small vertical flange 82 spaced closely adjacent the side wall of the vessel 2. The sides 78 and bottom 72 of basket 70 are provided with small perforations 84 to permit water ejected at the top of the fountain tube and sprayed over the coffee within the basket to flow or percolate back down into the vessel.

Secured to the inside wall 4 of the vessel, somewhat below the bottom of basket 70 and at points diametrically disposed on a generally horizontal axis, is a pair of generally upright V-shaped supports 86, 88. Cradled in the apices of the V-shaped supports for tilting movement about the horizontal axis defined thereby are respective trunnions 90, 92 which support at diametrically spaced points the bottom 94 of a shallow tray 96. The tray 96 is generally cylindrical in shape but its bottom 94 is preferably somewhat inclined relative to its top about an axis parallel to the axis of the trunnions, so that the portion of the tray on one side of the trunnion axis is shallower than on the other side of the trunnion axis. The tray is preferably inherently unbalanced about the trunnion axis, so that it tends to tilt thereabout, depressing its deeper side and elevating its shallower side. The bottom of the tray is apertured to fit over fountain tube 58 and is provided with an upstanding re-entrant tube 100 to prevent spillage from the tray at its center. At opposite ends of the diameter perpendicular to the axis of the trunnions, the bottom of the tray is apertured to provide a drain 102 defined by a downturned lip 103 on its shallow or lighter side, and a diametrically spaced drain 104 defined by a downturned lip 106 on its deeper or heavier side.

Mounted on the side of the tray adjacent the drain 104, is a brew strength control 110. The control 110 includes a vertically disposed slide 112 provided with a slot 114 within which engages a rivet 116 or the like secured to the side of the tray to support the control 110 and permit limited horizontal adjustment in a direction generally parallel to the axis of the trunnions. Secured to the bottom of the slide 112 is a generally horizontally disposed, laterally extending flange 118. The outer edge of the flange 118 is provided with successive steps 120, 122, 124 which define portions of progressively decreasing lateral dimension.

Engageable with the under side of the flange 118 is the upper end 128 of a generally vertically disposed temperature-sensitive element 130, preferably of the bimetallic type. The bimetallic element is preferably of such a length as to extend downwardly within the vessel far enough so that a substantial portion of its length is below the filling level of the water in the vessel and is hence immersed therein during the coffee brewing operation. The bimetallic element is secured at its lower end to the wall 4 of the vessel by a rivet 132 or the like, and is so positioned relative to the tray 96 that, when cold, its upper end engages the bottom of flange 118 of the control 110 and supports the tray 96 in a tilted position, with the supported side of the tray uppermost so that the bottom of the tray is downwardly inclined toward the drain 102.

The element 130 is arranged so that, as the water in the vessel is heated and the element 130 in turn becomes heated, its resulting deflection moves the upper end of the element 130 outwardly toward the wall 4 of the vessel and eventually withdraws it from supporting engagement with the control flange 118. When this happens, of course, the tray 96 is free to tilt, and since it is heavier on the side previously supported by element 130, the resulting tilting of the tray depresses this side and elevates drain 102 above drain 104. Control 110 is made slidable by means of slot 114 to permit alignment with element 130 of whichever of the steps 120, 122, 124 is desired, the step selected of course determining the deflection of element 130 required, and hence the temperature rise or heating period required, to remove the support from tray 96. The top of slide 112 has a pointer 134, and the side of tray 96 is suitably inscribed with brew strength indicia to permit convenient selection of any desired strength in advance.

In the side wall of the vessel is an outwardly and downwardly inclined delivery spout 140, the inner end of which extends inside the wall 4 of vessel 2 and has an upwardly curved mouth portion 144 which is disposed directly beneath the drain 104 of tray 96. The top of the mouth portion is disposed slightly above the maximum filling level 5 of the water in the vessel.

The operation of the coffee maker is believed apparent from the above description. The vessel 2 is filled with the amount of water necessary to make the desired amount of brewed coffee, such as for example a single cup, and the fountain tube 58 and valve 64 are placed in the vessel and seated in the well 42. Control 110 is then adjusted for the brew strength desired, and the tray 96 slipped over the fountain tube and its trunnions 90, 92 journaled in the V-shaped supports 86, 88. The basket 70 is then slipped over the top of fountain tube 58 and filled with the proper amount of coffee and the cover 6 of the vessel 2 put on. The manual switch is then turned on by raising the outer end of switch arm 32, which releases the cam 30 from engagement with the bimetallic element 28 and lug 24 and permits the flexible contact arms 18, 20 to close the contacts 14, 16 and energize the heating element. The water is then heated and pumped up through the fountain tube and sprayed or distributed over the top of the ground coffee in basket 70.

As the water percolates down through the coffee and seeps out through the perforations 84 in the sides and bottom of the basket, it drains into and is collected by the tray 96. Since the bottom of the tray is tilted and is higher at the side supported by the bimetallic element 130, the water caught by the tray flows across the bottom to the drain 102, and drains back down to the bottom of the vessel 2 for recirculation. As the brewing process continues and the water in the vessel is converted to a coffee brew approaching the desired strength, the heating of the water and the interior of the vessel bends the bimetallic element 130 so that its upper end moves outwardly toward the wall 4 of the vessel. The extent to which the element 130 must deflect before disengaging from the flange 118 and releasing the tray is controlled by the point at which the control 110 is slidably positioned relative to the tray. For a strong brew the control 110 is positioned so that the bimetallic element 130 engages the widest step 120 of the flange and hence must be deflected furthest and thus heated the longest before disengaging from the tray.

When the bimetallic element is heated sufficiently to curve out of supporting engagement with the flange 118, the tray tilts about the axis of the trunnions, and the heavy side of the tray previously uppermost falls downwardly into engagement with the mouth 144 of the spout 140. In this position of tray 96 the bottom 94 of the tray is inclined downwardly toward the drain 104, and hence all liquid thereafter draining into the tray from basket 70 flows across the bottom of the tray and escapes from drain 104 into the spout 140. Liquid thus entering the spout flows outwardly and downwardly therefrom and is automatically delivered from its outer end into a convenient receptacle, such as a coffee cup or the like, previously placed beneath the spout.

Thereafter the remaining liquid in vessel 2 is heated and pumped up the fountain tube 58, drains through basket 70 into tray 96, and is automatically funneled by the tray through the drain 104 and discharged out of spout 140. In this way the vessel is self-emptying, and the entire amount of coffee brewed therein is automatically delivered into the waiting receptacle.

After the coffee maker has emptied itself, the subsequent elevation of the temperature adjacent the heating coil 10 deflects the bimetallic element sufficiently to engage the lug 24, open the contacts 14, 16, and de-energize the heating coil 10. When the lower end of the bimetallic strip 28 is thus curved into contact opening engagement with the lug 24, it disengages from the cam and the outer end of the pivot arm 32 then drops downwardly to its "Off" position, at which the cam re-engages the lower end of the bimetallic element and holds the contacts open even after the bimetallic element cools.

Thus there has been shown and described a coffee maker which operates completely automatically to brew coffee of any desired strength, and at the end of the brewing operation automatically delivers its entire contents into a waiting receptacle, such as a coffee cup, and turns itself off. Thus the coffee maker of the present invention is substantially fool-proof in operation, automatically insures the production of a brew which is consistently of the desired strength, and performs its complete operating cycle without inspection, care, or attention of any kind.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. In a coffee maker of the type having a vessel for holding water to be heated, a perforated basket for holding ground coffee, and a fountain tube through which said water is circulated from the bottom of the vessel to a point above said basket and distributed over said coffee to drain therethrough and form a coffee brew; a spout in said vessel having its inner end disposed below said basket, a tray mounted between said basket and spout for movement between a first position to funnel liquid draining from said basket into the vessel and a second position to funnel liquid into said spout, and temperature sensitive means controlling movement of said tray from said first to said second position when the temperature in said vessel is raised to a selected level.

2. In a coffee maker of the type having a vessel for holding water to be heated, a perforated basket for holding ground coffee, and a fountain tube through which said water is circulated from the bottom of the vessel to a point above said basket and distributed over said coffee to drain therethrough and form a coffee brew; a spout in said vessel having its inner end disposed below said basket, a tray mounted between said basket and spout for tilting between one position to funnel liquid draining from said basket into the vessel and another position to funnel liquid into said spout, means biasing said tray to said other position, and temperature sensitive means supporting said tray in said one position and adapted to release said tray for tilting to said other position when the temperature in said vessel is raised to a selected level.

3. In a coffee maker of the type having a vessel for holding water to be heated, a perforated basket for holding ground coffee, and a fountain tube through which said water is circulated from the bottom of the vessel to a point above said basket and distributed over said coffee to drain therethrough and form a coffee brew, the improvement which comprises a downwardly inclined spout in the side of said vessel having an upturned inner end disposed below said basket, a tray mounted between said basket and spout for rocking between one position to funnel liquid draining from said basket into the vessel and another position to funnel liquid draining from said basket into said spout for discharge from said vessel, means biasing said tray to said other position, and temperature sensitive means supporting said tray in said one position and adapted to release said tray for rocking to said other position when the water in said vessel is heated to a selected temperature.

4. In a coffee maker of the type having a vessel for holding water to be heated, a perforated basket for holding ground coffee, and a fountain tube through which said water is circulated from the bottom of the vessel to a point above said basket and distributed over said coffee to drain therethrough and form a coffee brew; a downwardly inclined spout in the side of said vessel having its inner end disposed below said basket, a tray mounted between said basket and spout for tilting between one position to funnel liquid draining from said basket into the vessel and another position to funnel liquid into said spout for discharge from said vessel, means biasing said tray to said other tilted position, temperature sensitive means supporting said tray in said one position and adapted to release said tray for tilting to said other position when the water in said vessel is heated to a selected temperature, and an adjustable control for varying said selected tray release temperature to vary the brewing time of said coffee maker.

5. In a coffee maker of the type having a vessel for holding water to be heated, a perforated basket for holding ground coffee, and a fountain tube through which said water is circulated from the bottom of the vessel to a point above said basket and distributed over said coffee to drain therethrough and form a coffee brew; a downwardly inclined spout in the side of said vessel having its inner end disposed below said basket, a tray mounted between said basket and spout for tilting between a first position to funnel liquid draining from said basket into the vessel and a second position to funnel liquid draining from said basket into said spout for discharge from said vessel, said tray being heavier on one side so as to tilt to said second position when unsupported, and temperature sensitive means supporting said tray in said first position and adapted to release said tray for tilting to said second position when the water in said vessel is heated to a selected temperature.

6. In a coffee maker of the type having a vessel for holding water to be heated, a perforated basket for holding ground coffee, and a fountain tube through which said water is circulated from the bottom of the vessel to a point above said basket and distributed over said coffee to drain therethrough and form a coffee brew; an outwardly and downwardly inclined spout in the side of said vessel having its inner end disposed below said basket, a tray mounted between said basket and spout for tilting between a first position to funnel liquid draining from said basket into the vessel and a second position to funnel liquid into said spout for discharge from said vessel, said tray being unbalanced to tilt to said second position when unsupported, a control on said tray having a laterally extending surface, a bimetallic element engageable with said surface to support said tray in said first position and adapted to release said tray for tilting to said second position when the temperature in said vessel is raised to a selected level, and means for adjusting said control to vary said selected tray release temperature.

References Cited in the file of this patent

UNITED STATES PATENTS

| | | |
|---|---|---|
| 2,295,433 | Steinmetz | Sept. 8, 1942 |
| 2,618,219 | Hummel | Nov. 18, 1952 |